(12) United States Patent
Kouri (10) Patent No.: US 11,027,930 B1
(45) Date of Patent: Jun. 8, 2021

(54) SIDE-LOADING ROBOTIC ARM (71) Applicant: Anthony Stephen Kouri, Breckenridge, TX (US)

(72) Inventor: Anthony Stephen Kouri, Breckenridge, TX (US)

( * ) Notice: Subject to any disclaimer, the term of this patent is extended or adjusted under 35 U.S.C. 154(b) by 0 days.

(21) Appl. No.: 16/703,049

(22) Filed: Dec. 4, 2019

(51) Int. Cl.
| | |
|---|---|
| B65G 65/23 | (2006.01) |
| B25J 11/00 | (2006.01) |
| B25J 15/00 | (2006.01) |
| B65F 3/04 | (2006.01) |
| B25J 18/00 | (2006.01) |
| B65F 3/02 | (2006.01) |

(52) U.S. Cl.
CPC ............ B65G 65/23 (2013.01); B25J 11/008 (2013.01); B25J 15/0028 (2013.01); B25J 18/007 (2013.01); B65F 3/043 (2013.01); *B65F 2003/023* (2013.01); *B65F 2003/0266* (2013.01); *B65G 2201/04* (2013.01)

(58) Field of Classification Search
CPC ...... B65G 65/23; B65J 15/0028; B65F 3/043; B65F 2003/0266
See application file for complete search history.

(56) References Cited

U.S. PATENT DOCUMENTS

| | | | | |
|---|---|---|---|---|
| 4,401,407 A * | 8/1983 | Breckenridge | ......... | B65F 3/043 |
| | | | | 294/106 |
| 5,755,547 A * | 5/1998 | Flerchinger | ............. | B65F 3/046 |
| | | | | 414/408 |
| 6,213,706 B1 * | 4/2001 | Christenson | ............ | B65F 3/046 |
| | | | | 414/408 |
| 6,474,928 B1 * | 11/2002 | Christenson | ............ | B65F 3/001 |
| | | | | 414/408 |
| 6,520,008 B1 * | 2/2003 | Stragier | .................. | B65F 3/048 |
| | | | | 414/584 |
| 7,390,159 B2 * | 6/2008 | Rimsa | ..................... | B65F 3/046 |
| | | | | 414/408 |
| 8,092,141 B2 * | 1/2012 | Curotto | .................. | B65F 3/041 |
| | | | | 414/408 |
| 9,272,843 B2 * | 3/2016 | Parker | ..................... | B65F 3/041 |
| 9,296,558 B2 * | 3/2016 | Parker | ..................... | B65F 3/041 |
| 9,738,446 B2 * | 8/2017 | Rowland | ................. | B65F 3/041 |
| 10,221,012 B2 * | 3/2019 | Hund, Jr. | .................. | B65F 3/04 |
| 10,611,566 B1 * | 4/2020 | Campbell | ................ | B65F 3/28 |
| 10,661,986 B2 * | 5/2020 | Price | ....................... | B65F 3/046 |
| 10,730,190 B2 * | 8/2020 | Kouri | ........................ | B25J 5/00 |

(Continued)

*Primary Examiner* — Kaitlin S Joerger (74) *Attorney, Agent, or Firm* — Kelly & Kelley, LLP (57) ABSTRACT

A side-loading robotic arm for use with rear or mid-body mounted refuse containers. The robotic arm is configured for disposition forward of a container, but may be disposed behind or otherwise oriented relative to the container. The robotic arm includes a tipping arm pivotingly attached to and carried by a carriage body disposed on lateral rails. The tipping arm has a generally right-angle configuration. A lifting arm is pivotingly attached to the tipping arm distal from the carriage body. A pair of gripper arms is disposed on the lifting arm distal from the tipping arm. The right-angle configuration of the tipping arm facilitates pivoting and inversion of bins to be emptied into the refuse containers. The fixed shape of the tipping arm eliminates a mechanical movement operation of the prior art and minimizes potential mechanical interference with other parts of the robotic arm.

9 Claims, 10 Drawing Sheets

(56) References Cited

U.S. PATENT DOCUMENTS

| | | | |
|---|---|---|---|
| 10,730,695 B2* | 8/2020 | Kouri | B25J 11/008 |
| 10,787,314 B2* | 9/2020 | Hund, Jr. | B65F 3/04 |
| 2002/0154973 A1* | 10/2002 | Bradshaw | B65F 3/041 |
| | | | 414/408 |
| 2006/0280582 A1* | 12/2006 | Kouri | B65F 3/201 |
| | | | 414/408 |
| 2018/0029795 A1* | 2/2018 | Arrez | B65F 3/041 |
| 2019/0152699 A1* | 5/2019 | Parker | B65F 3/041 |
| 2019/0345973 A1* | 11/2019 | Gentry | F16C 33/26 |
| 2020/0180860 A1* | 6/2020 | Searle | B65F 3/046 |

* cited by examiner

Ikely, the means for lifting comprises a piston or a lifting
SIDE-LOADING ROBOTIC ARM

BACKGROUND OF THE INVENTION

The present invention is directed to a robotic arm mechanism for waste disposal vehicles. More particularly, the invention is directed to a side-loading robotic arm compatible for use with a container on a mid-body loader, but may be compatible with both front-end and rear-end loaders.

Conventional side-loading robotic arms are typically integral with or otherwise attached to the containers with which they are intended to be used. Such prior art arms typically involve a raising or lowering mechanism that includes an upright member that telescopically moves between a raised and lowered position relative to a point of rotation. Once the upright member is raised, the entire robotic arm is pivoted about the point of rotation such that a bin grasped by clamps at a lower end of the upright member can be emptied into the container.

Such telescoping movement of the upright member creates a situation where at least a portion of the upright member protrudes a significant distance above the point of rotation when in the raised position. Such protrusion above the point of rotation requires a large clearance area above the prior art arm. Without such clearance, the upright member may come into contact or otherwise impact surrounding structures.

In addition, such protrusion can also restrict the amount that the upright member may be rotated about the point of rotation. Depending upon how much the upright member protrudes above the point of rotation, the upright member may come into contact with the structure supporting the robotic arm. Thus, the prior art robotic arm must be constructed so as to minimize the chance of such contact during pivoting rotation.

Accordingly, there is a need for an improved side-loading robotic arm that minimizes the amount of over-head clearance that is required, as well as, minimizing the chance of mechanical contact during rotation. The present invention fulfills these needs and provides other related advantages.

SUMMARY OF THE INVENTION

The present invention is directed to a side-loading robotic arm for grasping and tipping bins of cans into a larger container. The side-loading robotic arm includes a pair of lateral rails disposed in parallel and attached forward of a front wall of a container. A carriage body is reciprocatingly disposed on the pair of lateral rails with a tipping arm pivotingly attached to a first end of the carriage body. A means for tipping is operational on the tipping arm and configured to pivot the tipping arm about the first end of the carriage body. A lifting arm is pivotingly attached to the tipping arm distal from the carriage body. A means for lifting is operational on the lifting arm and configured to pivot the lifting arm about the tipping arm. A pair of gripper arms is pivotingly attached to the lifting arm distal from the tipping arm.

Preferably, the tipping arm comprises a lateral portion and an upright portion oriented generally perpendicular to each other. The lateral portion is pivotingly attached to the carriage body and the upright portion is pivotingly attached to the lifting arm. The means for tipping preferably comprises a piston, a mechanical belt, a chain, a cable, or a geared connection. Ideally, the means for tipping is a piston or tipping piston attached at one end to a second end of the carriage body and at an opposite end to the lateral portion of the tipping arm.

Preferably, the means for lifting comprises a piston, a mechanical belt, a chain, a cable, or a geared connection. Ideally, the means for lifting comprises a piston or a lifting piston attached at one end to the lifting arm proximate to the upright portion of the tipping arm and at an opposite end to the upright portion of the tipping arm proximate to the lateral portion.

The robotic arm may also include a means for stabilizing that is operational on the pair of gripper arms and configured to stabilize a horizontal orientation of the pair of gripper arms during pivoting of the lifting arm. Such means for stabilizing preferably comprises a stabilizing linkage member connected at one end to the pair of gripper arms and at an opposite end to the tipping arm proximate to the lifting arm.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
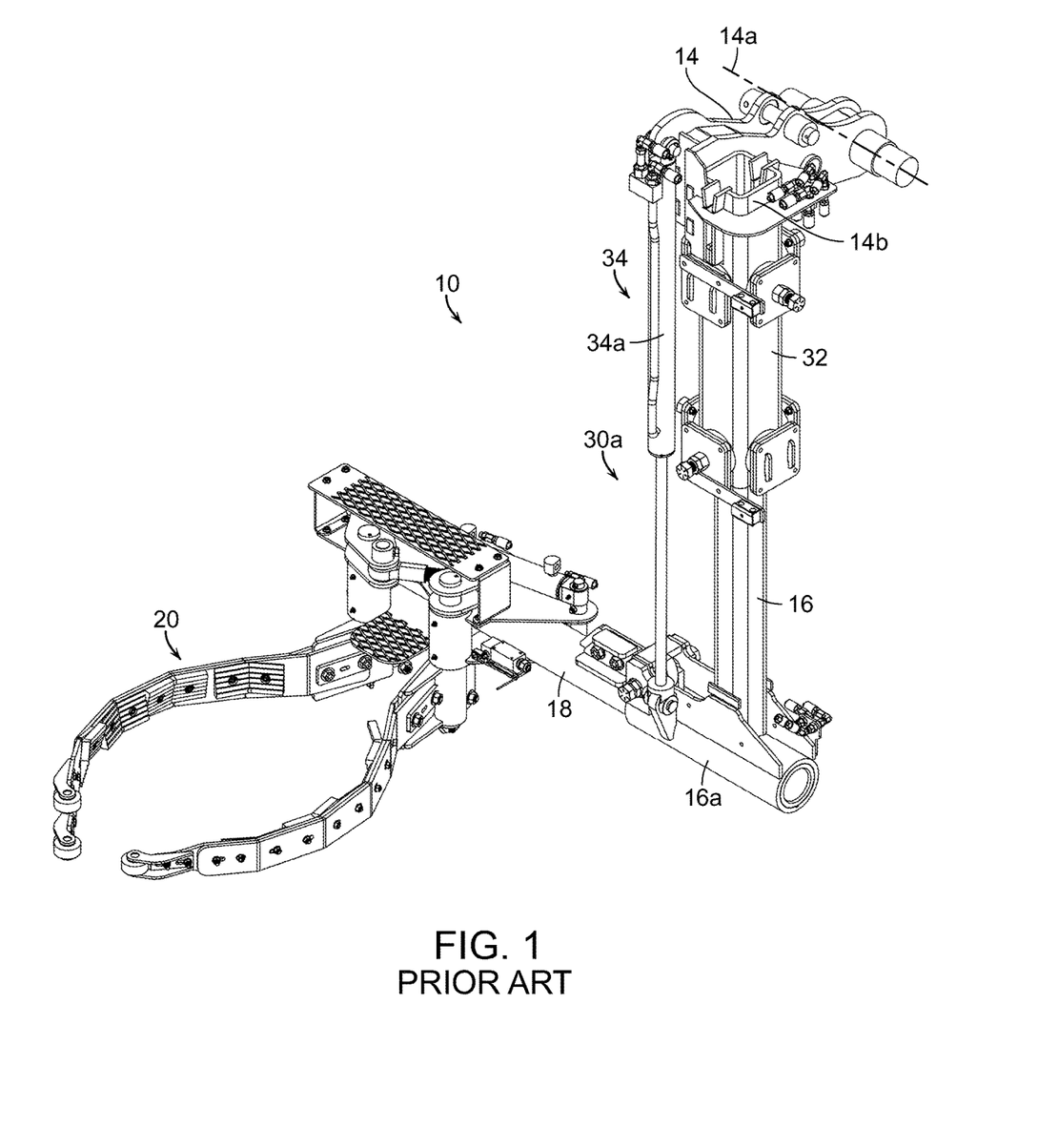
FIG. 1 is a perspective view of a prior art side-loading robotic arm in a lowered position.
Figure 2:
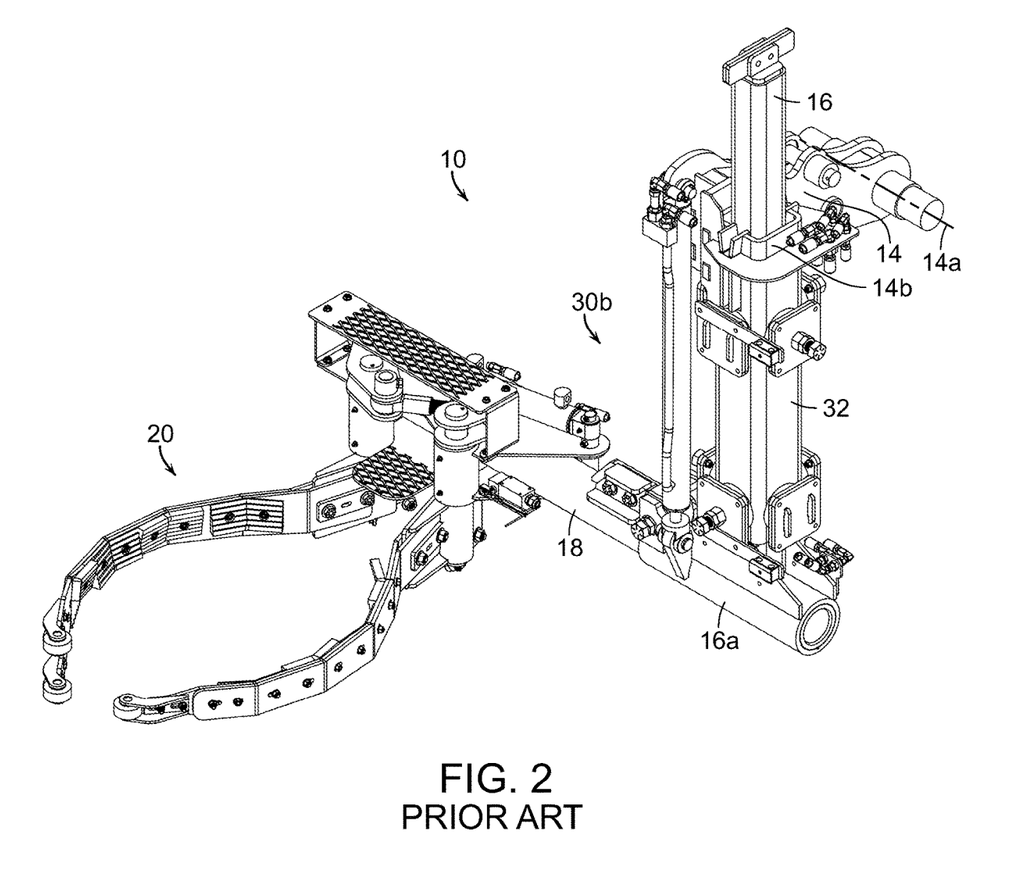
FIG. 2 is a perspective view of a prior art side-loading robotic arm in a raised position.
Figure 3:
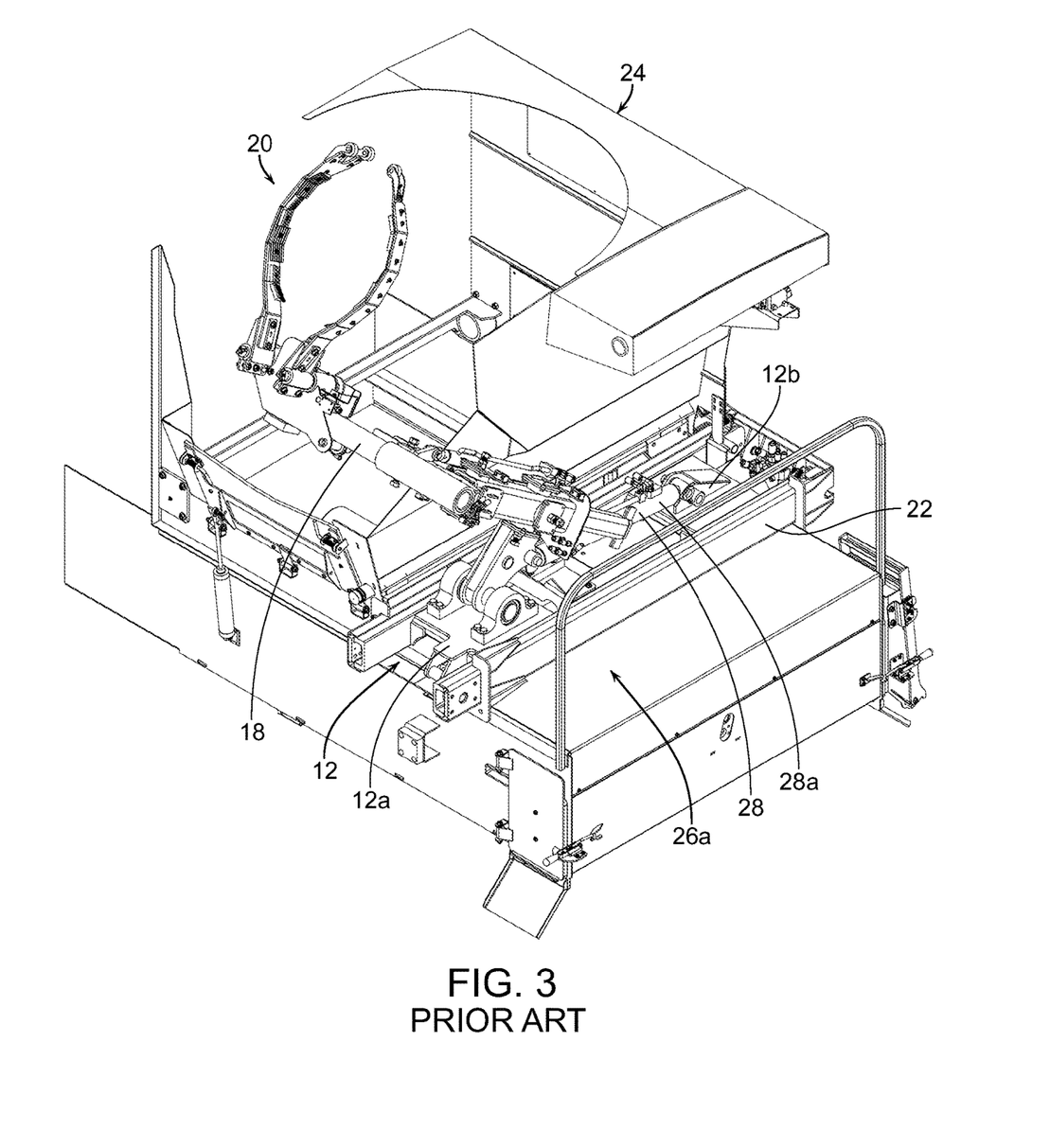
FIG. 3 is a perspective view of a prior art side-loading robotic arm in a pivoted position.
Figure 4:
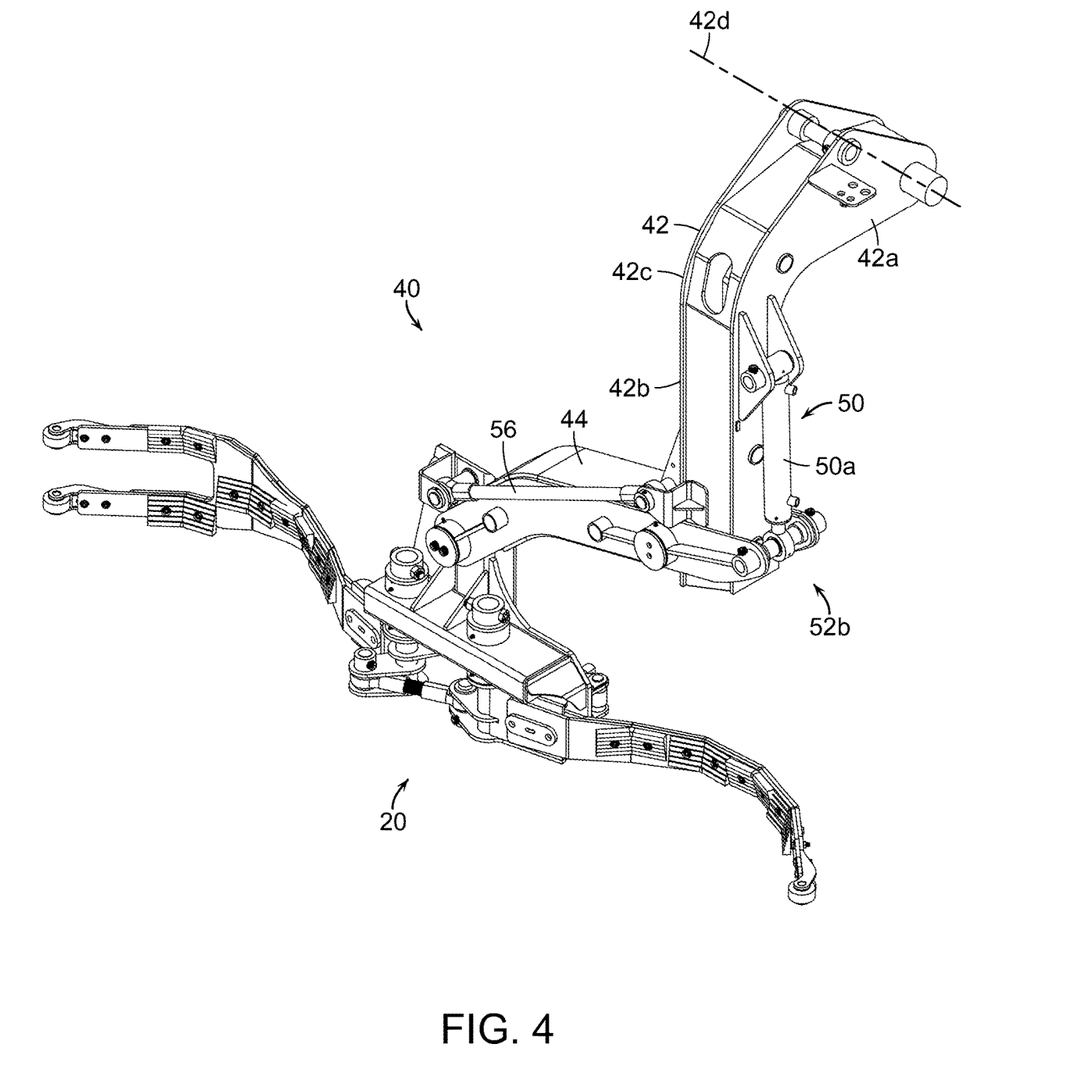
FIG. 4 is a perspective view of a side-loading robotic arm according to the present invention.
Figure 5:
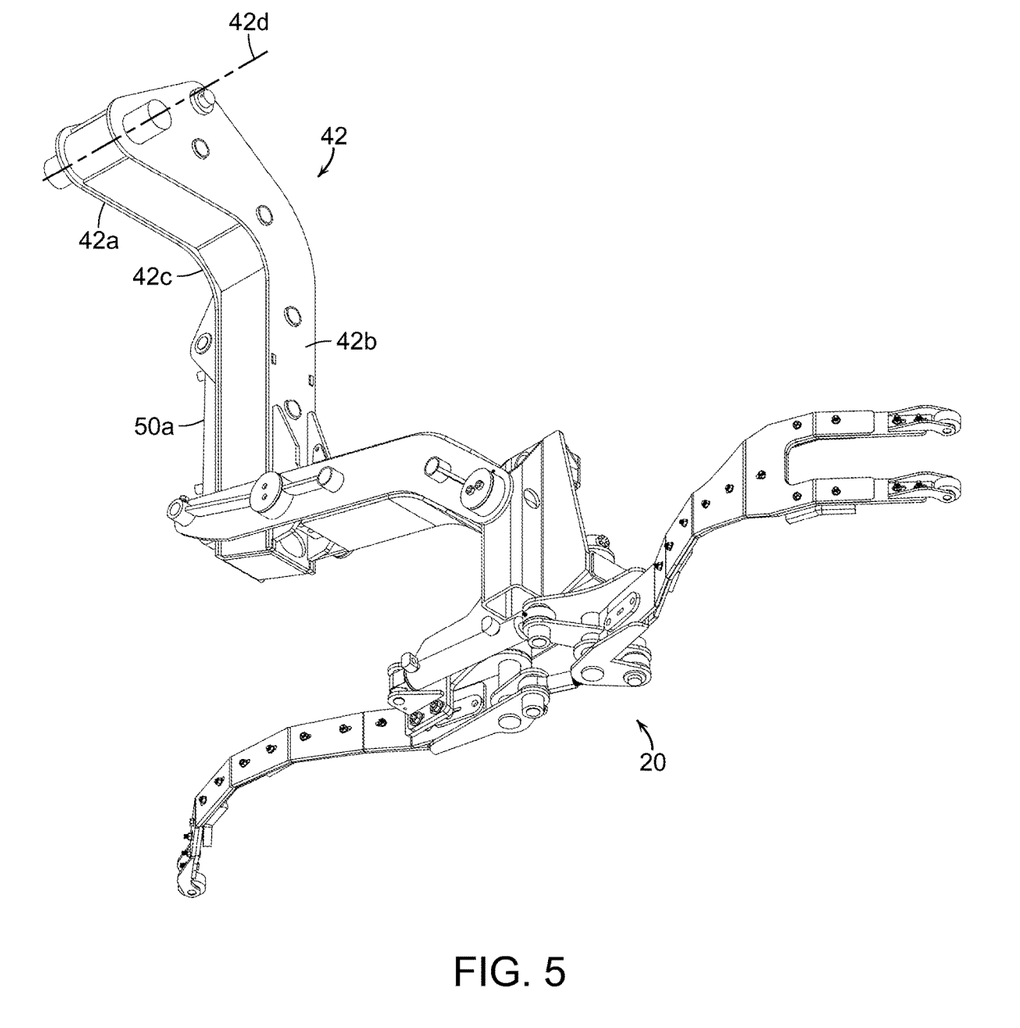
FIG. 5 is a reversed perspective view of a side-loading robotic arm according to the present invention.

The prior art side-loading robotic arm 10 is shown in FIGS. 1-3. As shown In these figures, the prior art robotic arm 10 includes a carriage body 12 carrying a pivoting body 14, an upright member 16, an offset arm 18, and gripper arms 20. The offset arm 18 extends from the upright member 16 and supports the gripper arms 20 at a point longitudinally offset from the pivoting body 14. The carriage body 12 is reciprocatingly engaged with a pair of lateral rails 22, allowing the carriage body 12 to move laterally along the rails relative to an adjacent container 24.

The pivoting body 14 is pivotingly attached about an axis of rotation 14a proximate to a first end 12a of the carriage body 12. The pivoting body 14 is configured to pivot between a down position 26a (not shown for Prior Art embodiment) and an up position 26b. FIGS. 1 and 2 generally show the down position 26a when the pivoting body 14 is attached to the carriage body 12 (not shown in these FIGURES). FIG. 3 generally shows the up position 26b. A means for tipping 28 the pivoting body 14 about the axis of rotation 14a. The means for tipping 28 preferably comprises a pneumatic or hydraulic piston 28a, a mechanical belt, chain or cable, a geared connection, or a similar mechanism for achieving the desired pivoting movement. FIG. 3 illustrates the means for tipping 28 as a piston cylinder 28a attached at one end to the pivoting body 14 and at an opposite end to a second end 12b of the carriage body 12.

The pivoting body 14 includes a thru-port 14b through which the upright member 16 is reciprocatingly passed. The upright member 16 has a cross-body 16a at an end distal from the pivoting body 14. The upright member 16 preferably has a range of reciprocating motion between a lowered position 30a and a raised position 30b, which corresponds to a length of the upright member 16 relative to a support body 32 extending below the thru-port 14b of the pivoting body 14. The upright member 16 includes a means for raising 34 attached at one end to the cross-body 16a and at an opposite end proximate to the thru-port 14b. As with the means for tipping 28, the means for raising 34 preferably comprises a pneumatic or hydraulic piston 34a, a mechanical belt, chain or cable, a geared connection, or a similar mechanism for achieving the desired reciprocating movement.

In this configuration, the upright member 16 is movable between the lowered position 30a and the raised position 30b. Depending upon the height of the robotic arm 10 relative to a ground surface (not shown), the gripper arms 20 can be used to grasp a bin or other refuse can at any point between the lowered positon 30a and the raised position 30b. The carriage body 12 may also be extended or retracted relative to the lateral rails 22 depending upon the distance between the robotic arm 10 and the bin.

Once the gripper arms 20 grasp the bin, the upright member 16 is placed fully in the raised position 30b. If extended, the carriage body 12 is retracted back into the lateral rails 22. The pivoting body 14 is also pivoted about the axis 14a such that the upright member 16 and gripper arms 20 are raised into a tipping position over a container 24. When the upright member 16 is in the raised position 30b, an upper end of the upright member 16 extends well above the pivoting member 14. Because of such extension, the pivoting motion mush be concerned with the upright member 16 intersecting a portion of the container 24 or any other structure positioned above the robotic arm 10.

In addition, when in the raised position 30b, the portion of the upright member 16 that extends above the pivoting member 14 may interfere with full pivoting of the pivoting body 14. As shown in FIG. 3, the portion of the upright member 16 that extends above the pivoting body 14 may intersect the carriage body 12 and prevent sufficient rotation of the pivoting body 14.

The inventive robotic arm 40, shown generally in FIGS. 4-10, includes important improvements over this prior art design. The robotic arm 40 includes a carriage body 12 reciprocatingly disposed on a pair of lateral rails 22 attached adjacent to a container 24 for holding refuse or other waste. Instead of the pivoting body 14 and upright member 16 of the prior art robotic arm 10, the inventive robotic arm 40 includes a tipping arm 42 and a lifting arm 44. The tipping arm 42 is pivotingly attached to the first end 12a of the carriage body 12 about an axis of rotation 42d. The tipping arm 42 has a lateral portion 42a and an upright portion 42b, which portions 42a, 42b are oriented generally perpendicular to each other at an elbow 42c. The lifting arm 44 is pivotingly attached to an end of the upright portion 42b distal from the lateral portion 42a and pivotable in a vertical plane relative to the upright portion 42b of the tipping arm 42. The gripper arms 20 are pivotingly attached to the lifting arm 44 distal from the upright portion 42b.

A tipping means 46 is attached to the tipping arm 42 and the carriage body 12. Preferably, one end of the tipping means 46 is attached to the lateral portion 42a of the tipping arm 42, and an opposite end of the tipping means 46 is attached proximate to the second end 12b of the carriage body 12. The tipping means 46 is configured to move the tipping arm 42 between a lowered or loading position 48a (FIGS. 6-9) and a raised or emptying position 48b (FIG. 10). Similar to the tipping means 28 described above, the tipping means 46 preferably comprises a pneumatic or hydraulic piston 46a, a mechanical belt, chain or cable, a geared connection, or a similar mechanism for achieving the desired pivoting movement. The piston 46a is preferable as it more reliably controls movement of the tipping arm 42 in both the upward (from the lowered position 48a to the raised position 48b) and the downward (from the raised position 48b to the lowered position 48a) directions.

Figure 6:
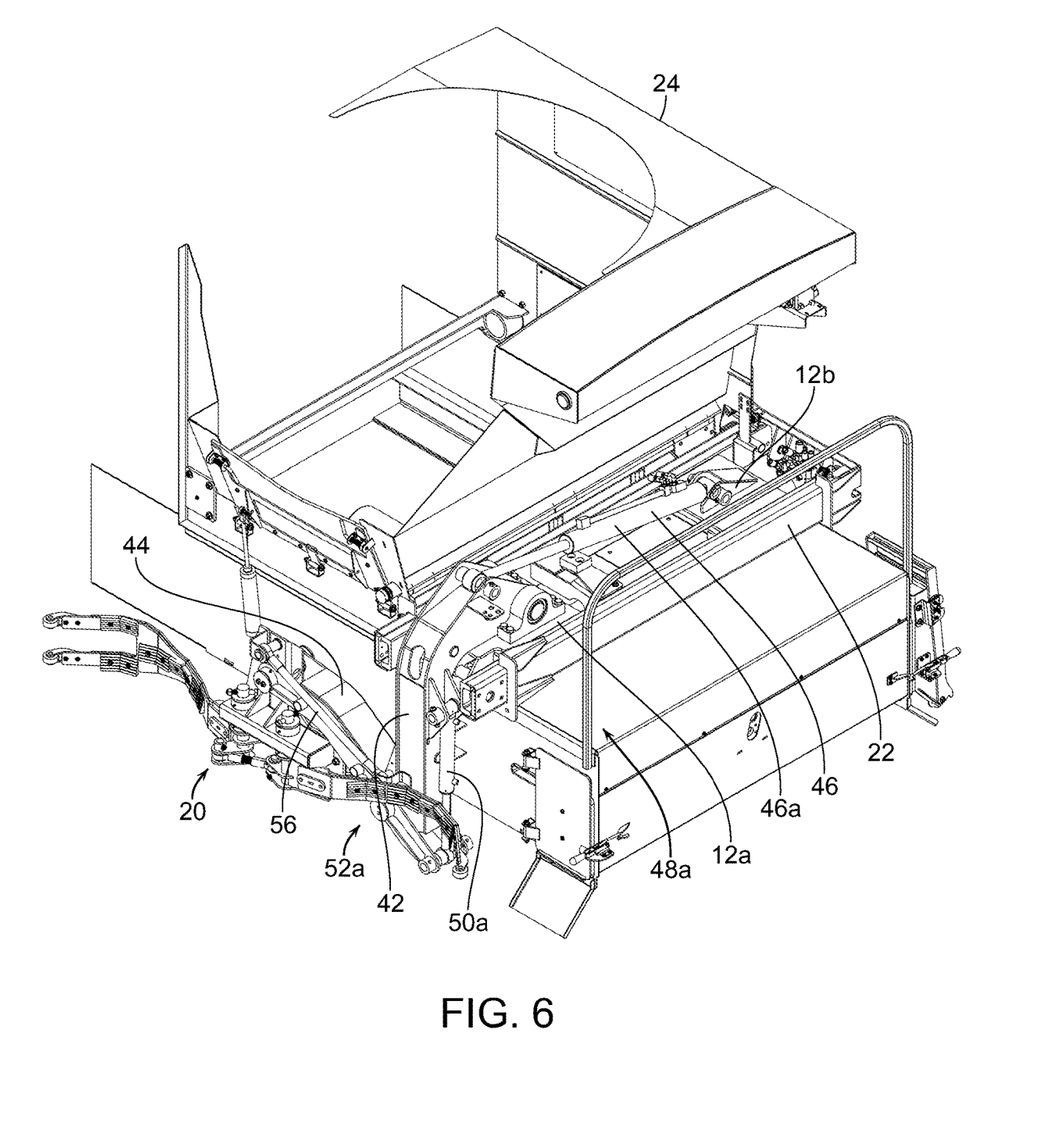
FIG. 6 is perspective view of a side-loading robotic arm according to the present invention mounted on a container.
Figure 7:
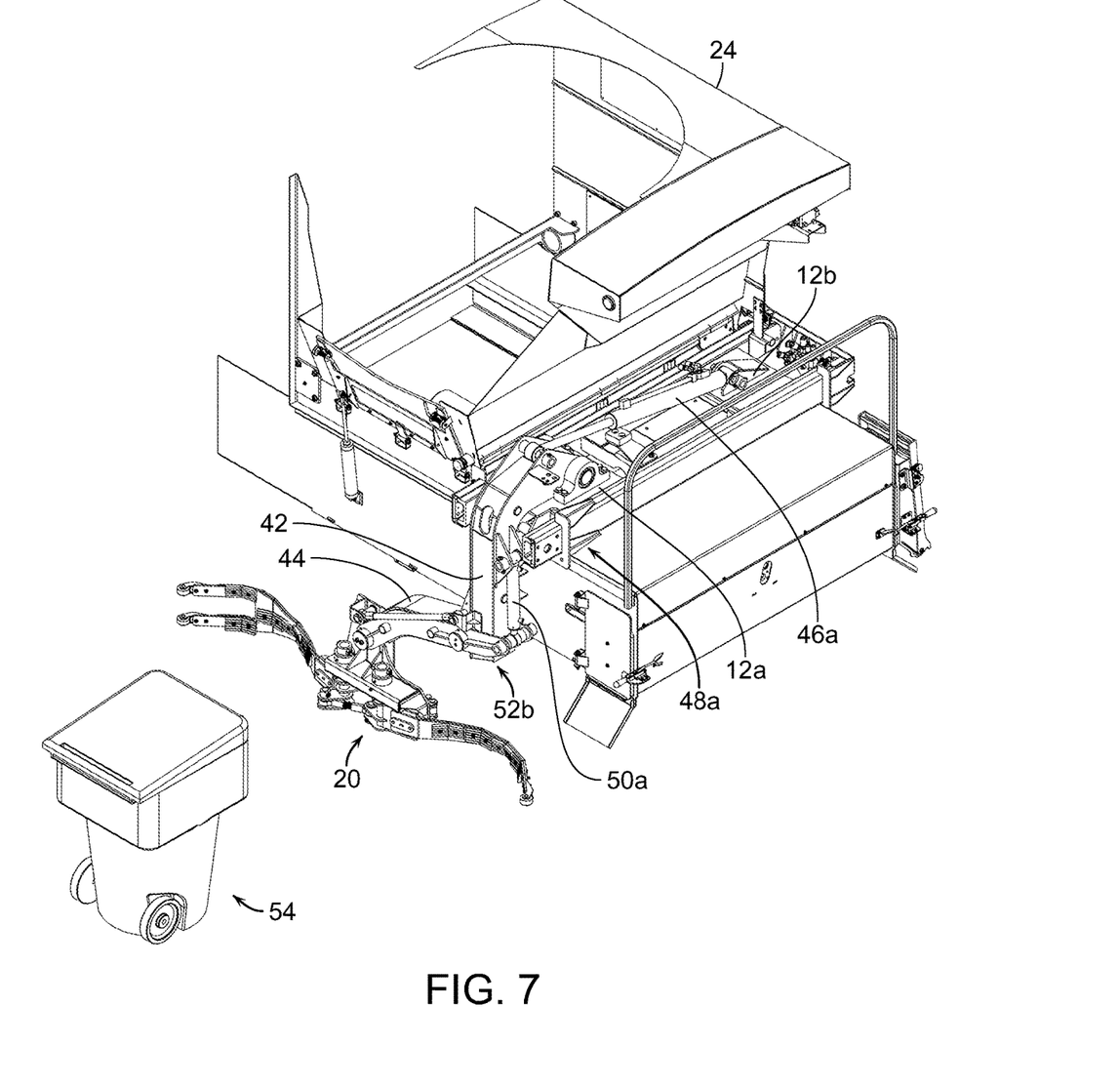
FIG. 7 is a perspective view of a side-loading robotic arm according to the present invention preparing to grasp a bin.

In addition, a lifting means 50 is attached to the lifting arm 44 and the tipping arm 42. Preferably, one end of the lifting means 50 is attached to the lifting arm 44 proximate to the upright portion 42b, and an opposite end of the lifting means 50 is attached to the upright portion 42b proximate to the elbow 42c. The lifting means 50 is configured to move or swing the lifting arm 44 between a raised position 52a (FIG. 6) and a lowered position 52b (FIG. 7) in a vertical plane that is generally perpendicular to the lateral portion 42a of the tipping arm 42. A comparison of FIGS. 6 and 7 shows that the raised position 52a positions the lifting arm 44 closer to or proximate the lateral portion 42a of the tipping arm 42 and the lowered position 52b positions the lifting arm 44 farther from or distal the lateral portion 42a of the tipping arm 42. Similar to the raising means 34 described above, the lifting means 50 preferably comprises a pneumatic or hydraulic piston 50a, a mechanical belt, chain or cable, a geared connection, or a similar mechanism for achieving the desired pivoting movement. The piston 50a is preferable as it more reliably controls movement of the lifting arm 44 in both the downward (from the raised position 52a to the lowered position 52b) and the upward (from the lowered position 52b to the raised position 52a) directions.

Figure 8:
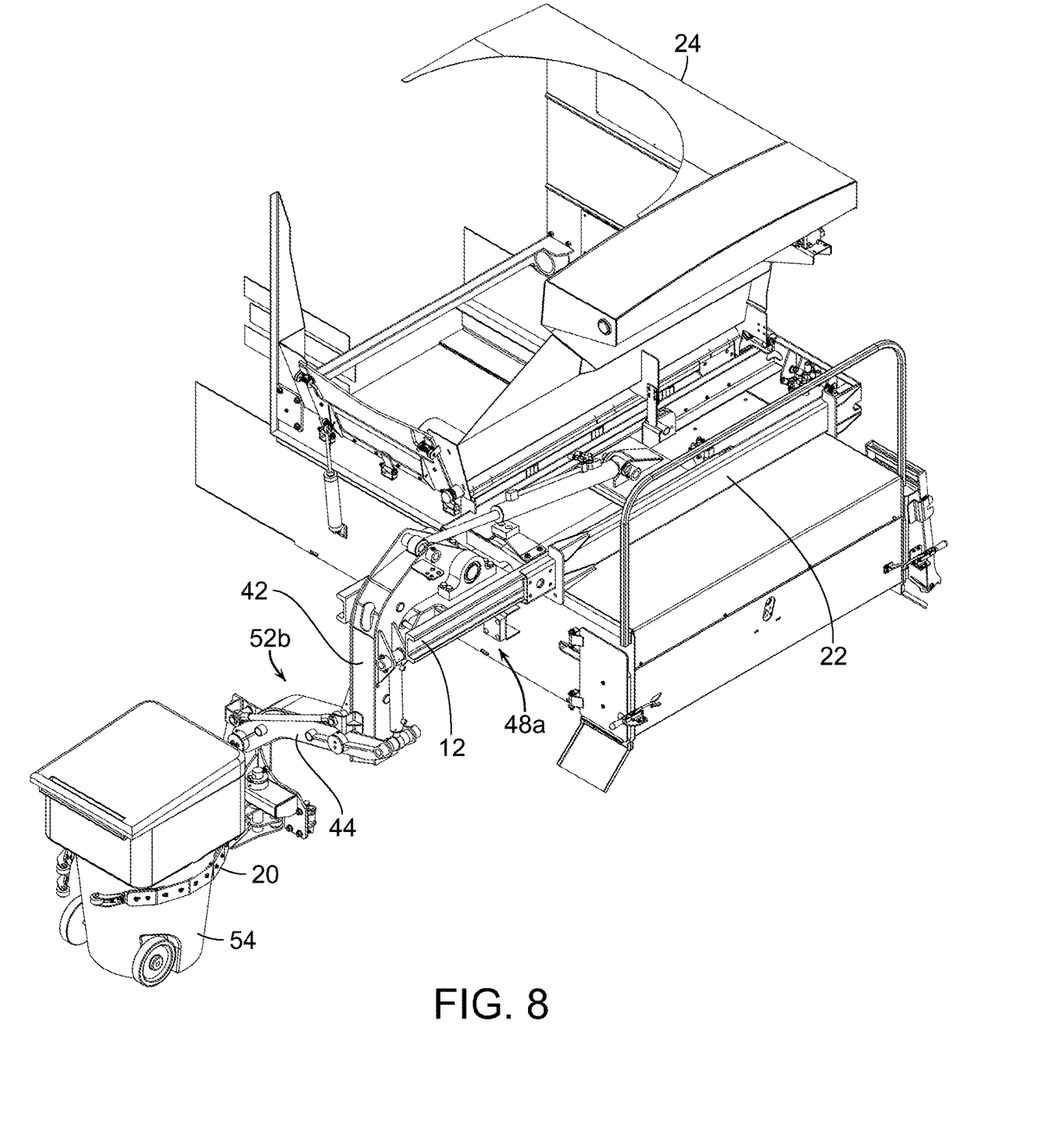
FIG. 8 is a perspective view of a side-loading robotic arm according to the present invention extended and gasping a bin.
Figure 9:
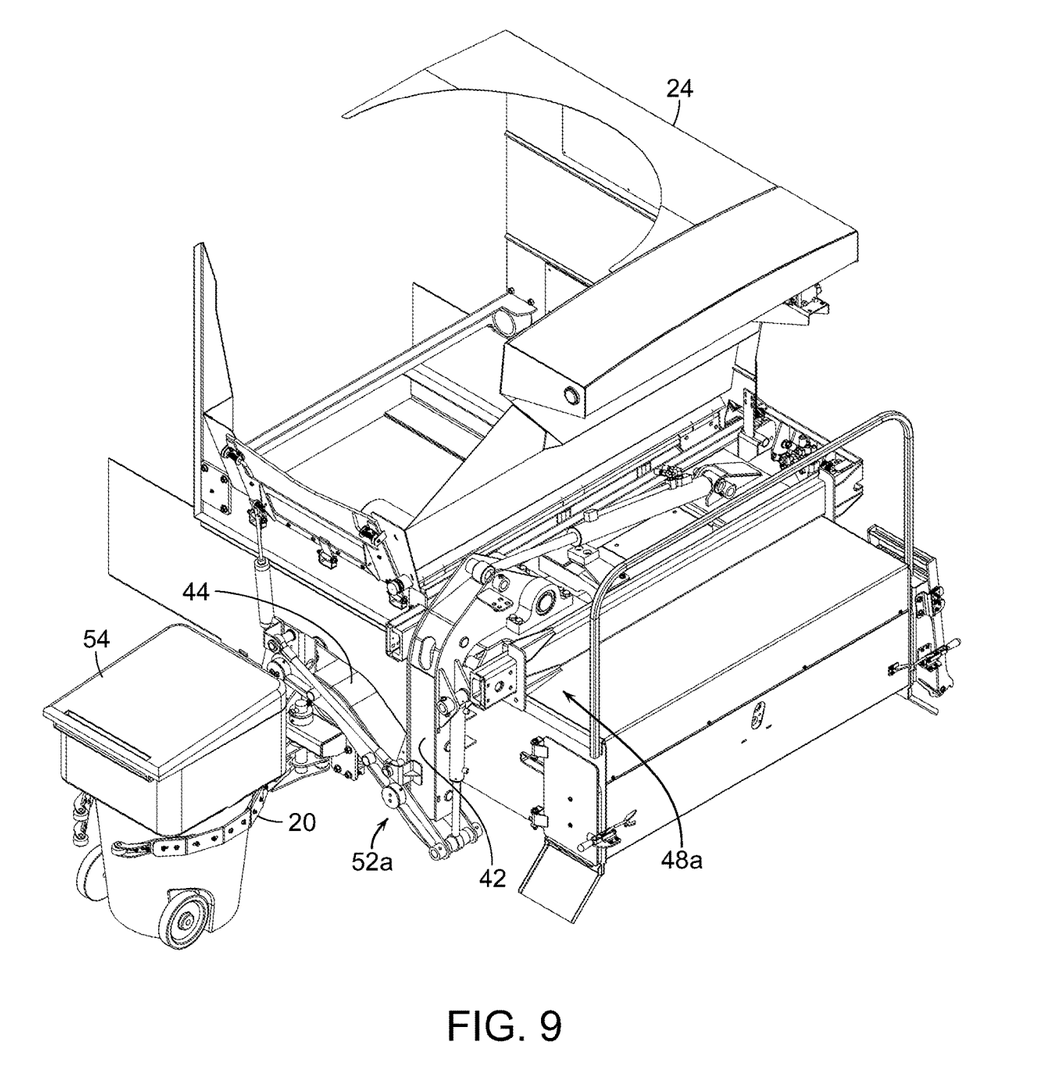
FIG. 9 is a perspective view of a side-loading robotic arm according to the present invention retracting and raising a bin.
Figure 10:
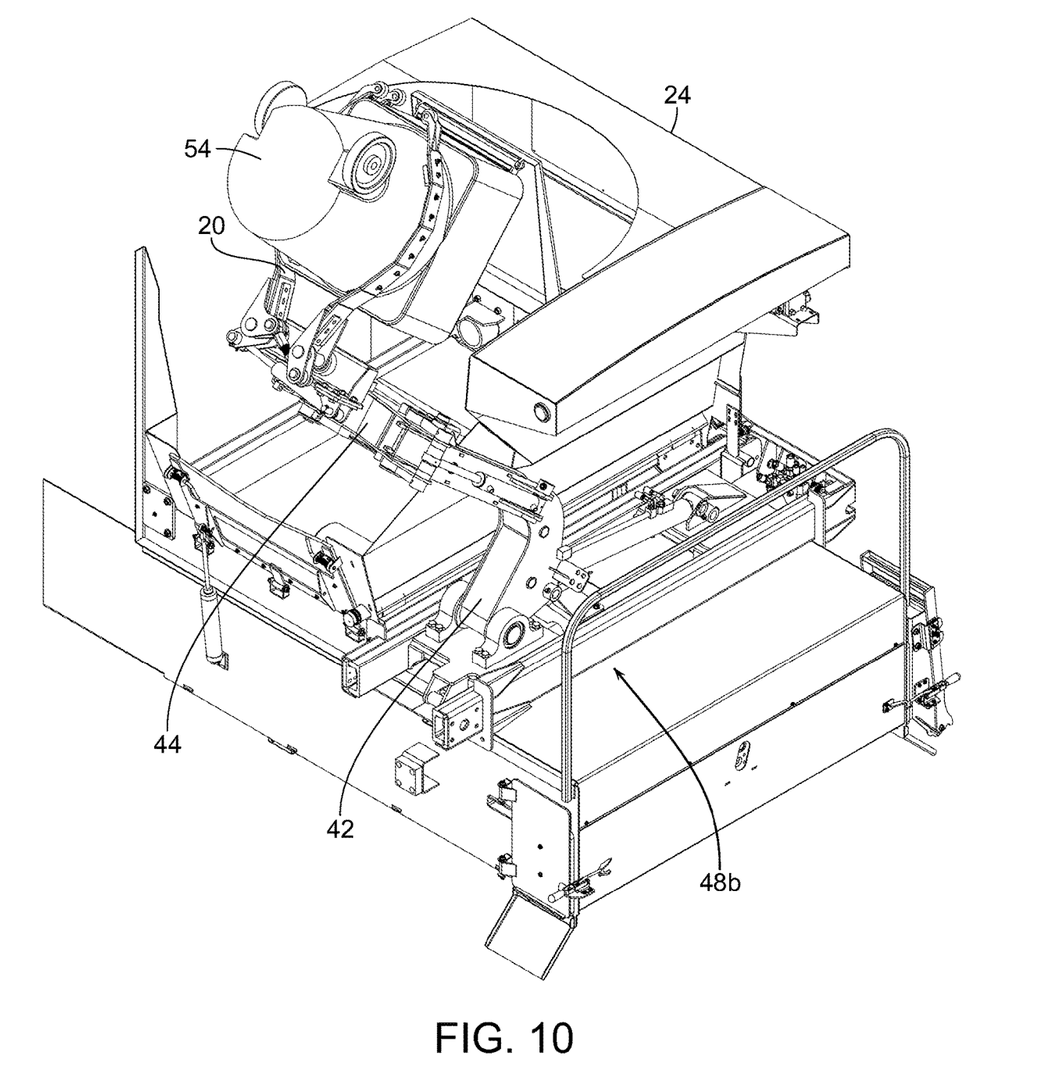
FIG. 10 is a perspective view of a side-loading robotic arm according to the present invention dumping a bin.

FIGS. 7-9 illustrate operation of the robotic arm 40 in grasping a bin 54 for emptying into the container 24. Specifically, the lifting arm 44 is moved to the lowered position 52b (FIG. 7). The carriage body 12 is them extended out of the lateral rails 22 to move the gripper arms 20 into proximity with the bin 54. Once the gripper arms 20 are in proximity of the bin 54, the same are closed so as to grasp the bin 54 (FIG. 8). Separately or simultaneously, the lifting arm 44 is moved into the raised position 52a and the carriage body 12 is retracted back into the lateral rails 22 so as to bring the bin 54 closer to the container 24 (FIG. 9). Then the tipping arm 42 is raised so as to invert the bin 24 over the container 24 and empty the contents of the same (FIG. 10). The bin 54 is returned to its starting position by performing these steps in the reverse order.

The robotic arm 40 may also include a stabilizing means 56 connecting the gripper arms 20 to the upright portion 42b. The stabilizing means 56 is configured to control movement of the gripper arms 20 relative to the lifting arm 44. Preferably, the stabilizing means 56 is a linkage 56a or similar mechanism that automatically pivots the gripper arms 20 relative to the lifting arm 44 during any of the lifting operations performed by the lifting means 50. Ideally, the stabilizing means 56 is configured to maintain the gripper arms 20 parallel to any surface upon which the bin 54 or other object is resting.

As can be seen in FIG. 10, the inventive design of the raising arm 42 eliminates many of the drawbacks of the prior art. The raising arm 42 does not have an upright member 16 that protrudes above a pivoting body 14. Such configuration eliminates the need for excessive clearance above the raising arm 42 to avoid contact with the protruding upright member 16. The elimination of the need for such clearance allows for more coverage or enclosure of the mechanical parts of the robotic arm 40 so as to minimize weather or other damage to the same.

In addition, the inventive configuration of the raising arm 42 allows for greater rotation of the raising arm 42 around the axis of rotation 42*d*. Specifically, the lack of the protruding upright member 16 eliminates the possibility of interference with the carriage body 12. Such freedom of movement allows for more reliability in inverting the bin 54 over the container 24 when emptying the contents of the same.

The inventive embodiment of the robotic arm 40 described herein has a number of particular features that should preferably be employed in combination, although each is useful separately without departure from the scope and spirit of the invention. Although preferred embodiments have been described in detail for purposes of illustration, various modifications may be made without departing from the scope and spirit of the invention. Accordingly, the invention is not to be limited, except as by the appended claims.

What is claimed is:

1. A side-loading robotic arm, comprising:
  a pair of lateral rails disposed in parallel and attached forward of a front wall of a container;
  a carriage body reciprocatingly disposed on the pair of lateral rails;
  a tipping arm comprising a lateral portion and an upright portion oriented generally perpendicular to each other, wherein the lateral portion is pivotingly attached to a first end of the carriage body and the tipping arm is configured to pivot relative to the first end of the carriage body between a loading position and an emptying position;
  a means for tipping to pivot the tipping arm between the loading position and the emptying position;
  a lifting arm pivotingly attached to the upright portion of the tipping arm distal from the carriage body and configured to swing between a raised position where the lifting arm is proximate to the lateral portion and a lowered position where the lifting arm is distal from the lateral portion;
  a means for lifting to swing the lifting arm between the raised position and the lowered position; and
  a pair of gripper arms pivotingly attached to the lifting arm distal from the tipping arm.

2. The robotic arm of claim 1, wherein the means for tipping comprises a piston, a mechanical belt, a chain, a cable, or a geared connection.

3. The robotic arm of claim 2, wherein the means for tipping comprises a piston attached at one end to a second end of the carriage body and at an opposite end to the lateral portion of the tipping arm.

4. The robotic arm of claim 1, wherein the means for lifting comprises a piston, a mechanical belt, a chain, a cable, or a geared connection.

5. The robotic arm of claim 4, wherein the means for lifting comprises a piston attached at one end to the lifting arm proximate to the upright portion of the tipping arm and at an opposite end to the upright portion of the tipping arm proximate to the lateral portion.

6. The robotic arm of claim 1, further comprising a means for stabilizing operational on the pair of gripper arms and configured to stabilize a horizontal orientation of the pair of gripper arms during pivoting of the lifting arm.

7. The robotic arm of claim 6, wherein the means for stabilizing comprises a linkage member connected at one end to the pair of gripper arms and at an opposite end to the tipping arm proximate to the lifting arm.

8. A side-loading robotic arm, comprising:
  a pair of lateral rails disposed in parallel and attached forward of a front wall of a container;
  a carriage body reciprocatingly disposed on the pair of lateral rails;
  a tipping arm comprising a lateral portion and an upright portion oriented generally perpendicular to each other, wherein the lateral portion is pivotingly attached to a first end of the carriage body and the tipping arm is configured to pivot relative to the first end of the carriage body between a loading position and an amptying position;
  a tipping piston cylinder attached at one end to the lateral portion of the tipping arm and at an opposite end to the carriage body for pivoting the tipping arm between the loading position and the emptying position;
  a lifting arm pivotingly attached to the upright portion of the tipping arm distal from the carriage body and configured to swing between a raised position where the lifting arm is proximate to the lateral portion and a lowered position where the lifting arm is distal from the lateral portion;
  a lifting piston cylinder attached at one end to the lifting arm and at an opposite end to the tipping arm for swinging the lifting arm between the raised position and the lowered position;
  a pair of gripper arms pivotingly attached to the lifting arm distal from the tipping arm; and
  means for stabilizing to stabilize a horizontal orientation of the pair of gripper arms during pivoting of the lifting arm.

9. The robotic arm of claim 8, wherein the means for stabilizing comprises a linkage member connected at one end to the pair of gripper arms and at an opposite end to the tipping arm proximate to the lifting arm.

\* \* \* \* \*